United States Patent
Dennis et al.

(10) Patent No.: US 11,556,362 B2
(45) Date of Patent: Jan. 17, 2023

(54) ROBOTIC PROCESS AUTOMATION SYSTEM WITH DEVICE USER IMPERSONATION

(71) Applicant: Automation Anywhere, Inc., San Jose, CA (US)

(72) Inventors: James Dennis, San Jose, CA (US); Rajaa Mohamad Abdul Razack, Dublin, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

(21) Appl. No.: 16/371,046

(22) Filed: Mar. 31, 2019

(65) Prior Publication Data

US 2020/0310844 A1 Oct. 1, 2020

(51) Int. Cl.

| | |
|---|---|
| G06F 9/48 | (2006.01) |
| G06F 9/455 | (2018.01) |
| G06F 9/50 | (2006.01) |
| G06F 21/44 | (2013.01) |

(52) U.S. Cl.
CPC ........ *G06F 9/45512* (2013.01); *G06F 9/5055* (2013.01); *G06F 21/44* (2013.01)

(58) Field of Classification Search
CPC ... B60C 25/0587; G06F 21/44; G06F 9/5055; H04L 63/10; H04L 63/107; H04L 63/12; H04L 21/62
See application file for complete search history.

(56) References Cited

U.S. PATENT DOCUMENTS

| | | | |
|---|---|---|---|
| 5,949,999 | A | 9/1999 | Song et al. |
| 5,983,001 | A | 11/1999 | Boughner et al. |
| 6,133,917 | A | 10/2000 | Feigner et al. |
| 6,389,592 | B1 | 5/2002 | Ayres et al. |
| 6,427,234 | B1 | 7/2002 | Chambers et al. |

(Continued)

FOREIGN PATENT DOCUMENTS

WO 2018017214 A1 1/2018

OTHER PUBLICATIONS

Szymon Rozga, Practical Bot Development, 2018, Apress (Year: 2018).*

(Continued)

*Primary Examiner* — Lewis A Bullock, Jr.
*Assistant Examiner* — Mohammad H Kabir (57) ABSTRACT

A robotic process automation system provides a capability to deploy software robots (bots) by receiving from a deployment user a bot deployment request comprising a bot identification that identifies a specific preexisting bot and an authorized class of user to execute the specific preexisting bot. Credentials of the deployment user are checked. An execution device upon which the specific preexisting bot will execute is identified from a set of available devices. An authorization token is issued for the execution device to uniquely identify the execution device and to authorize the execution device to communicate with the robotic process automation system. In response to a request by the execution device the specific preexisting bot and credentials corresponding to the authorized class of user are provided, wherein the specific preexisting bot executes on the execution device automatically without input from any individual corresponding to the authorized class of user.

16 Claims, 4 Drawing Sheets

(56) References Cited

U.S. PATENT DOCUMENTS

| | | | |
|---|---|---|---|
| 6,473,794 B1 | 10/2002 | Guheen et al. | |
| 6,496,979 B1 | 12/2002 | Chen et al. | |
| 6,640,244 B1 | 10/2003 | Bowman-Amuah | |
| 6,704,873 B1 | 3/2004 | Underwood | |
| 6,898,764 B2 | 5/2005 | Kemp | |
| 6,954,747 B1 | 10/2005 | Wang et al. | |
| 7,091,898 B2 | 8/2006 | Arling et al. | |
| 7,246,128 B2 | 7/2007 | Jordahl | |
| 7,398,469 B2 | 7/2008 | Kisamore et al. | |
| 7,441,007 B1 | 10/2008 | Kirkpatrick et al. | |
| 7,533,096 B2 | 5/2009 | Rice et al. | |
| 7,568,109 B2 | 7/2009 | Powell et al. | |
| 7,571,427 B2 | 8/2009 | Wang et al. | |
| 7,765,525 B1 | 7/2010 | Davidson et al. | |
| 7,805,317 B2 | 9/2010 | Khan et al. | |
| 7,805,710 B2 | 9/2010 | North | |
| 7,810,070 B2 | 10/2010 | Nasuti et al. | |
| 7,846,023 B2 | 12/2010 | Evans et al. | |
| 8,028,269 B2 | 9/2011 | Bhatia et al. | |
| 8,056,092 B2 | 11/2011 | Allen et al. | |
| 8,095,910 B2 | 1/2012 | Nathan et al. | |
| 8,132,156 B2 | 3/2012 | Malcolm | |
| 8,209,738 B2 | 6/2012 | Nicol et al. | |
| 8,234,622 B2 | 7/2012 | Meijer et al. | |
| 8,245,215 B2 | 8/2012 | Extra | |
| 8,352,464 B2 | 1/2013 | Fotev | |
| 8,396,890 B2 | 3/2013 | Lim | |
| 8,438,558 B1 | 5/2013 | Adams | |
| 8,443,291 B2 | 5/2013 | Ku et al. | |
| 8,464,240 B2 | 6/2013 | Fritsch et al. | |
| 8,498,473 B2 | 7/2013 | Chong et al. | |
| 8,504,803 B2 | 8/2013 | Shukla | |
| 8,631,458 B1 | 1/2014 | Banerjee | |
| 8,682,083 B2 | 3/2014 | Kumar et al. | |
| 8,713,003 B2 | 4/2014 | Fotev | |
| 8,769,482 B2 | 7/2014 | Batey et al. | |
| 8,819,241 B1 | 8/2014 | Washbur | |
| 8,832,048 B2 | 9/2014 | Lim | |
| 8,874,685 B1 | 10/2014 | Hollis et al. | |
| 8,943,493 B2 | 1/2015 | Schneider | |
| 8,965,905 B1 | 2/2015 | Ashmore et al. | |
| 9,104,294 B2 | 8/2015 | Forstall et al. | |
| 9,213,625 B1 | 12/2015 | Schrage | |
| 9,278,284 B2 | 3/2016 | Ruppert et al. | |
| 9,444,844 B2 | 9/2016 | Edery et al. | |
| 9,462,042 B2 | 10/2016 | Shukla et al. | |
| 9,571,332 B2 | 2/2017 | Subramaniam et al. | |
| 9,621,584 B1 | 4/2017 | Schmidt et al. | |
| 9,946,233 B2 | 4/2018 | Brun et al. | |
| 10,768,977 B1* | 9/2020 | Paul | G06F 11/0709 |
| 2002/0073160 A1* | 6/2002 | Purcell | G06F 16/958 |
| | | | 709/206 |
| 2003/0033590 A1 | 2/2003 | Leherbauer | |
| 2003/0101245 A1 | 5/2003 | Srinivasan et al. | |
| 2003/0159089 A1 | 8/2003 | DiJoseph | |
| 2004/0083472 A1 | 4/2004 | Rao et al. | |
| 2004/0172526 A1 | 9/2004 | Tann et al. | |
| 2004/0210885 A1 | 10/2004 | Wang et al. | |
| 2004/0243994 A1 | 12/2004 | Nasu | |
| 2005/0188357 A1 | 8/2005 | Derks et al. | |
| 2005/0204343 A1 | 9/2005 | Kisamore et al. | |
| 2005/0257214 A1 | 11/2005 | Moshir et al. | |
| 2006/0095276 A1 | 5/2006 | Axelrod et al. | |
| 2006/0150188 A1 | 7/2006 | Roman et al. | |
| 2007/0101291 A1 | 5/2007 | Forstall et al. | |
| 2007/0112574 A1 | 5/2007 | Greene | |
| 2008/0005086 A1 | 1/2008 | Moore | |
| 2008/0028392 A1 | 1/2008 | Chen et al. | |
| 2008/0209392 A1 | 8/2008 | Able et al. | |
| 2008/0222454 A1 | 9/2008 | Kelso | |
| 2008/0263024 A1 | 10/2008 | Landschaft et al. | |
| 2009/0037509 A1 | 2/2009 | Parekh et al. | |
| 2009/0103769 A1 | 4/2009 | Milov et al. | |
| 2009/0172814 A1 | 7/2009 | Khosravi et al. | |
| 2009/0199160 A1 | 8/2009 | Vaitheeswaran et al. | |
| 2009/0217309 A1 | 8/2009 | Grechanik et al. | |
| 2009/0249297 A1 | 10/2009 | Doshi et al. | |
| 2009/0313229 A1 | 12/2009 | Fellenstein et al. | |
| 2009/0320002 A1 | 12/2009 | Peri-Glass et al. | |
| 2010/0023602 A1 | 1/2010 | Martone | |
| 2010/0023933 A1 | 1/2010 | Bryant et al. | |
| 2010/0100605 A1 | 4/2010 | Allen et al. | |
| 2010/0138015 A1 | 6/2010 | Colombo et al. | |
| 2010/0235433 A1 | 9/2010 | Ansari et al. | |
| 2011/0022578 A1 | 1/2011 | Fotev | |
| 2011/0145807 A1 | 6/2011 | Molinie et al. | |
| 2011/0197121 A1 | 8/2011 | Kletter | |
| 2011/0276568 A1 | 11/2011 | Fotev | |
| 2011/0276946 A1 | 11/2011 | Pletter | |
| 2011/0302570 A1 | 12/2011 | Kurimilla et al. | |
| 2012/0042281 A1 | 2/2012 | Green | |
| 2012/0124062 A1 | 5/2012 | Macbeth et al. | |
| 2012/0284323 A1* | 11/2012 | Gamaley | H04L 12/1822 |
| | | | 709/202 |
| 2012/0330940 A1 | 12/2012 | Caire et al. | |
| 2013/0173648 A1 | 7/2013 | Tan et al. | |
| 2013/0290318 A1 | 10/2013 | Shapira et al. | |
| 2014/0181705 A1 | 6/2014 | Hey et al. | |
| 2015/0082280 A1 | 3/2015 | Betak et al. | |
| 2015/0347284 A1 | 12/2015 | Hey et al. | |
| 2016/0019049 A1 | 1/2016 | Kakhandiki et al. | |
| 2016/0078368 A1 | 3/2016 | Kakhandiki et al. | |
| 2018/0046796 A1* | 2/2018 | Wright | H04L 63/10 |
| 2018/0322403 A1* | 11/2018 | Ron | H04L 51/02 |
| 2019/0089697 A1* | 3/2019 | Delaney | H04L 63/0838 |
| 2019/0171513 A1* | 6/2019 | Purushothaman | G06F 11/0748 |
| 2019/0200519 A1* | 7/2019 | Chrysanthakopoulos | |
| | | | A01D 34/008 |

OTHER PUBLICATIONS

International Search Report for PCT/2020/025531.
Written Opinion of the International Searching Authority for PCT/2020/025531.
Al Sallami, Load Balancing in Green Cloud Computation, Proceedings of the World Congress on Engineering 2013 vol. II, WCE 2013, 2013, pp. 1-5 (Year: 2013).
B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.
Bergen et al., RPC automation: making legacy code relevant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2008).
Tom Yeh, Tsung-Hsiang Chang, and Robert C. Miller, Sikuli: Using GUI Screenshots for Search and Automation, Oct. 4-7, 2009, 10 pages.
Yu et al., Deploying and managing Web services: issues, solutions, and directions, 36 pages (Year: 2008).
Zhifang et al., Test automation on mobile device, May 2010, 7 pages.

* cited by examiner

ROBOTIC PROCESS AUTOMATION SYSTEM WITH DEVICE USER IMPERSONATION

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure a computer software or a "robot" (also referred to as a "bot") to capture and interpret existing applications for processing a transaction, manipulating data, triggering responses and communicating with other digital systems. Conventional RPA systems employ software robots to interpret the user interface of third-party applications and to execute steps identically to a human user. Typically, the bot will be initiated on a device by a human user who provides the bot with access credentials that the human user has to access certain systems and applications. For example, to complete its tasks, the bot may require login credentials to login as the human user onto a particular device, and then to login to various applications and other system services in order to access, store and/or modify certain data, send messages and perform other functions permitted by the applications. Although this process permits automation of a variety of manual tasks, it still requires a human user to deploy the bot with the user's own credentials.

SUMMARY

Embodiments disclosed herein simplify deployment of bots within an RPA system while ensuring the appropriate credentials are employed in accessing applications, data and computerized services. A bot deployment request may be made centrally by a user instead of requiring a human at a computer terminal, such as a desktop or laptop, who is authorized to deploy the bot. In the disclosed embodiments, a request to deploy a bot that identifies a particular bot and an authorized class of user is first checked to determine if the bot requester is authorized to deploy the particular bot for use by the authorized class of user. If so, then a device upon which the bot will execute is identified and an authorization token is issued to the identified device, for use by the identified device in interacting with the system. The identified device employs the authorization token in retrieving the requested bot and in retrieving credentials associated with the authorized class of user. The requested bot is then able to execute on the identified device automatically.

In conventional systems, the user that a bot runs as is determined by which user is logged into the device, and which device is deployed. Devices do not have their own identity; users must log into devices and the device employs the user's identity. Further in conventional systems, bot-specific permissions prevent a device from being used for bots with different purposes, and devices have no way to establish a connection without involving a human, who must know all required usernames and passwords for all devices. In the disclosed embodiments, in contrast, devices have their own identity rather than requiring a user to provide one.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Embodiments disclosed herein may implement a method and or system of deploying bots within a robotic process automation system to process assigned work tasks, such as for example, processing an invoice, loan application, new employee onboarding documentation and the like. A bot deployment request is received from a deployment user. The bot deployment request includes a bot identification that identifies a specific preexisting bot encoded to perform predefined application level tasks that may be performed by a human user. The bot deployment request further includes an authorized class of user to execute the specific preexisting bot. Credentials of the deployment user are checked to determine if the deployment user is authorized to deploy the specific preexisting bot with credentials of the authorized class of user. If the deployment user is determined to be authorized to deploy the specific preexisting bot with credentials of the authorized class of user then, an execution device is identified, from a set of available devices, upon which the specific preexisting bot will execute. An authorization token is issued for the execution device to uniquely identify the execution device and to authorize the execution device to communicate with the robotic process automation system. In response to a request by the execution device the specific preexisting bot and credentials corresponding to the authorized class of user are provided to the execution device. The specific preexisting bot executes on the execution device automatically without input from any individual corresponding to the authorized class of user.

Figure 1:
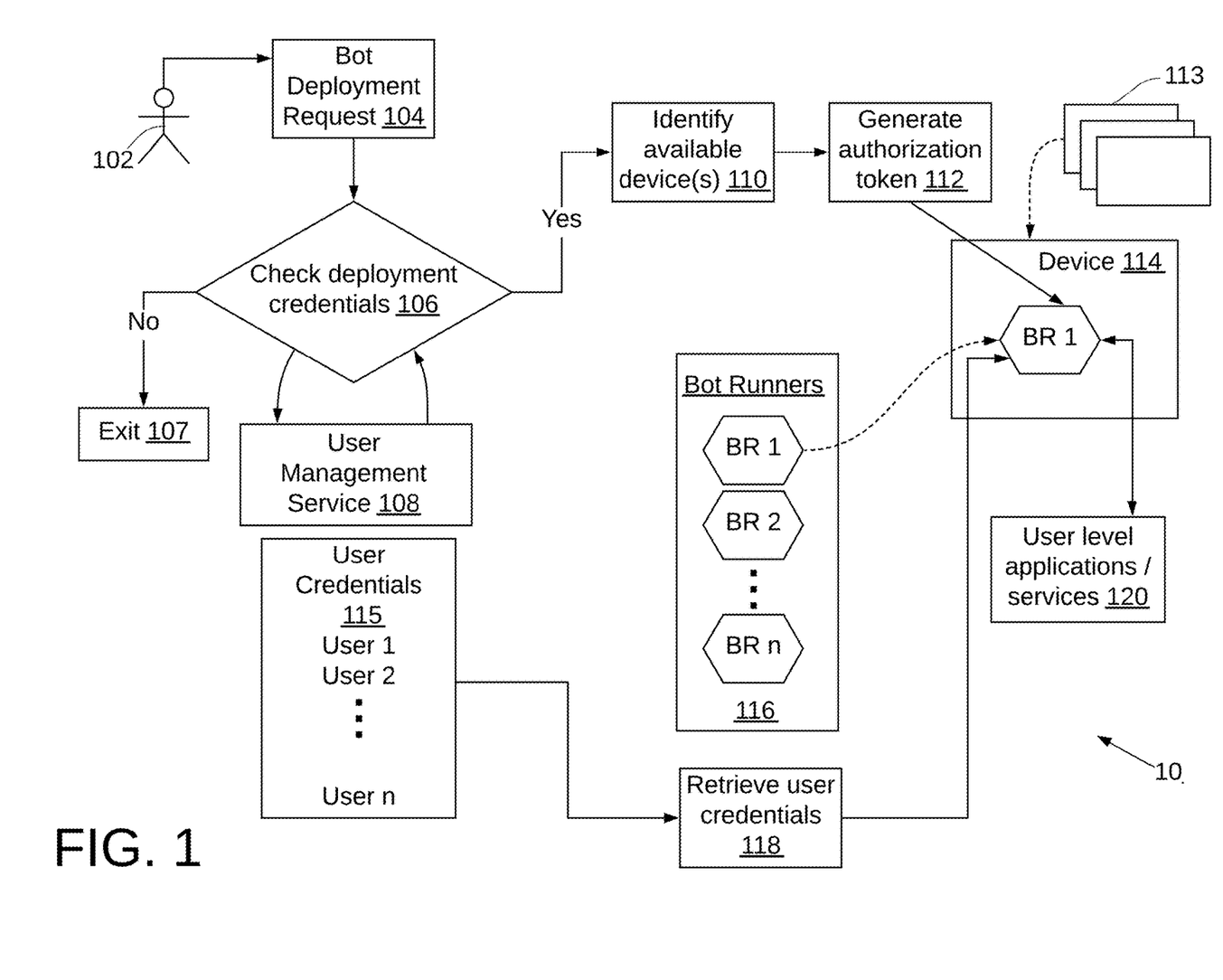
FIG. 1 is a high-level flow diagram illustrating operation of an embodiment of an RPA system 10 with device user impersonation.

Further details may be seen in FIG. 1 which is a high-level flow diagram illustrating operation of an embodiment of an RPA system 10 with device user impersonation. A user 102, termed herein as a "deployment user", issues a bot deployment request 104 to the RPA system 10. The bot deployment request identifies (i) a specific bot to be executed, and (ii) a class of user to execute the bot. Optionally, the bot deployment request may also identify how many devices are needed, and/or a specific device or a type of device, such as a device with certain processing and/or storage capability. The class of user will be a type of user authorized to execute the functions performed by the bot and to access data required by the bot. For example, if the requested bot is one that processes invoices then the class of user may be an accounts payable user, or in other words a user with the authorization to process an invoice. Or if the requested bot is one that onboards a newly hired employee, then the class of user may be a human resources user, or in other words a user with the authorization to on board a newly hired employee. The term "bot" as used herein refers to a set of instructions that cause a computing resource to interact with one or more user level computer applications to perform tasks provided by the one or more user level computer applications. Once created, the bot may be employed to perform the tasks as encoded by the instructions to interact with one or more user level computer applications.

The RPA system 10 checks the deployment credentials at 106 of the deployment user 102 with a user management service 108 to ensure that the deployment user 102 has the authority to cause execution of the specified bot with the credentials of the specified class of user. For example, within an organization, the submission of a request for an invoice processing bot to operate with the credentials of an accounts payable user may be limited to a manager level individual in the organization's accounts payable department. Similarly, the onboarding of a newly hired employee may be limited to human resources personnel, and/or the hiring manager. If the deployment user 102 does not have the appropriate credentials to cause deployment of the requested bot with the specified class of user, then the process in FIG. 1 terminates at 107 and the user 102 is notified. If the user 102 is determined at 106 to have the credentials to cause deployment of the requested bot with the specified class of user, the system 10 proceeds at 110 to identify and select an available device from among a set of devices 113, or devices in the event that multiple devices were specified. In the event that a specific device was specified then that specific device is selected, and in the event that the device is in use, then the request may be queued. An authorization token is generated at 112 for the selected device 114. The authorization token provides the selected device 114 with a unique identity that uniquely identifies the device and permits interaction with the system 10. This beneficial security feature limits interaction with the system 10 to devices that are specifically authorized by the system 10 by way of authorization tokens issued by the system 10. In certain embodiments, the system 10 will store what class of user was last used to run a bot on a device and will suggest it by default to simplify bot deployment.

The system 10 retrieves and provides to the selected device 114 the specified bot, seen as BR 1, from a bot repository 116. The system 10 also at 118 retrieves and provides to the selected device 114 the user credentials 115 required to run the specified bot BR1. For example, the user credentials 115 may include login information (login ID, password) required for the applications and other services 116 that the specified bot BR1 will be required to access. The specified bot BR1 then executes on the selected device 114 to interact as programmed with various user level applications and other services 120 to process specified tasks. Examples of such tasks, are invoices, new hire onboarding documents and expense reports. These are simple examples and many other task types may be processed with RPA system 10. The tasks will often be stored as files, and often as image encoded files (e.g. PDF, TIFF) which may need to be scanned and processed to extract and to recognize the information stored therein. Further aspects of such scanning and processing may be found in pending patent application, which is assigned to the assignee of the present application, entitled "AUTOMATIC KEY/VALUE PAIR EXTRACTION FROM DOCUMENT IMAGES USING DEEP LEARNING", which was filed in the U.S. Patent and Trademark Office on Dec. 29, 2017, and assigned Ser. No. 15/858,976, and which is hereby incorporated in its entirety by reference.

Figure 2A:
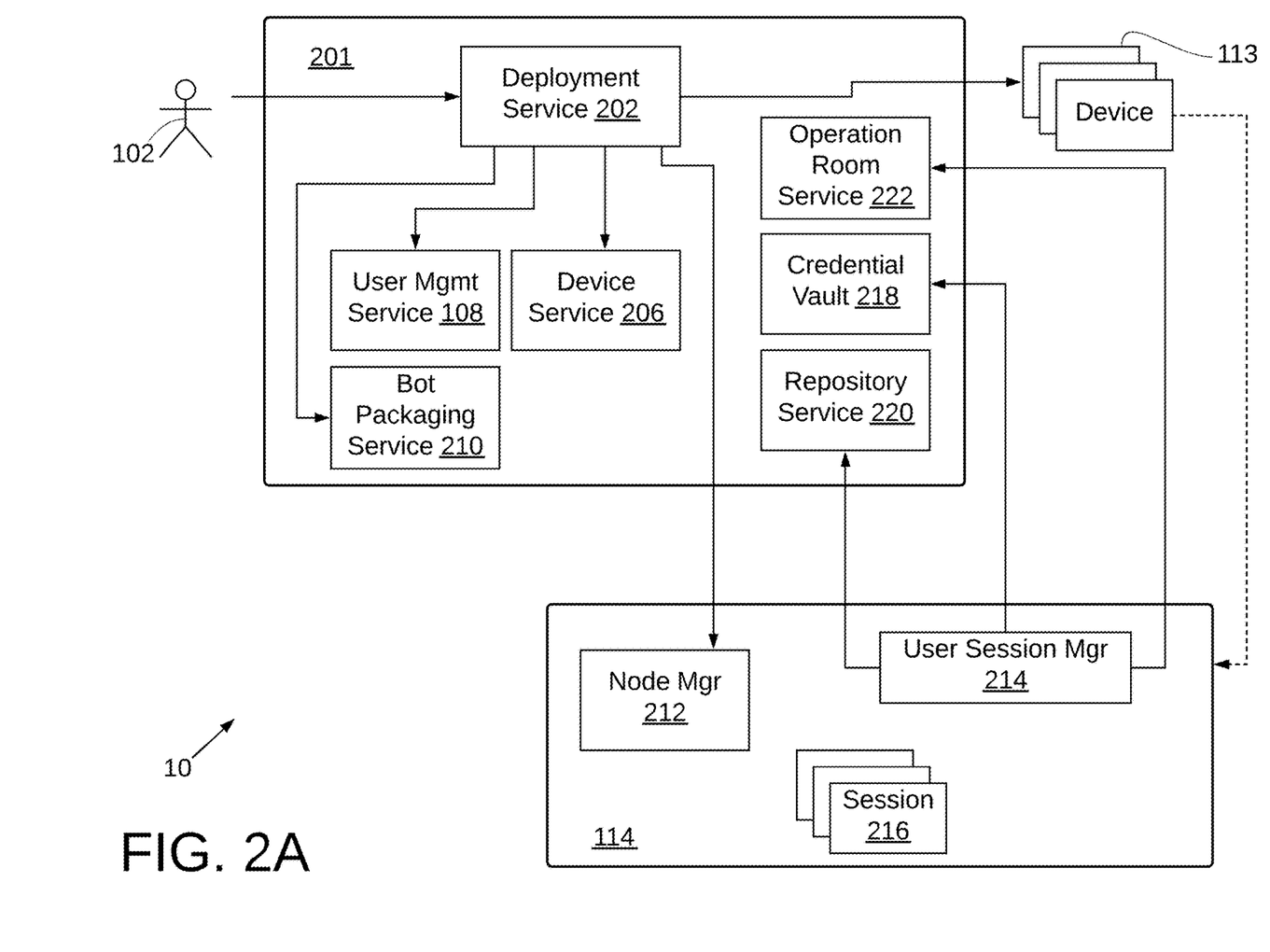
FIG. 2A is block diagram illustrating functional modules of a first embodiment of the RPA system 10.

FIG. 2A is block diagram illustrating functional modules of a first embodiment of the RPA system 10. Deployment user 102 interacts with RPA system 10 via a control room 201 which provides an interface by which the deployment user 102 may deploy bot runners 116 to one or more devices 113 and perform various system administration functions. The control room 201 includes deployment service 202 which processes bot deployment request 104 to check deployment credentials 106 via user management service 108. As noted in connection with FIG. 1, the bot deployment request identifies (i) a specific bot to be executed, and (ii) a class of user to execute the bot, and optionally, the bot deployment request may also identify how many devices are needed, and/or a specific device or a type of device, such as a device with certain processing capability. In addition, in certain embodiments, the bot deployment request may also include a blueprint that provides a template of a requested device, such as specifying processing capability, storage requirements, and required software (i.e. software stored upon the device and/or accessible by the device). Upon verifying deployment credentials of deployment user 102, deployment service 202 issues a device request to device service 206 by providing a command to identify available device(s) (operation 110 of FIG. 1). Optionally, the command by deployment service 202 to device service 206 may also include identifiers for specific devices, or a blueprint of required devices. The command may also include a count for the number of devices requested, together with a size parameter that optionally overrides performance capabilities when using a blueprint. The device service 206 responds by providing identifiers from among available devices 113 of the devices assigned pursuant to the device request by deployment service 202. The deployment service 202 also issues a request to user management service 108 for a user token for each user required for the bot requested by deployment user 102. In this respect, it should be understood that any given bot may be coded to perform tasks by more than one user, in which case the user management service 108 will provide a token for each required user. The deployment service 202 also issues a request to bot packaging service 210 to compile the requested bot and to package any necessary dependencies. The process of compilation takes a higher-level representation of the actions that the bot needs to take and turns them into an optimized format that the device can understand and execute. Dependencies are data required for the bot to perform its function. One type of dependency is a resource dependency: supporting data that is processed by the bot when it executes, provided by the bot developer (e.g. spreadsheet or image file). Another type of dependency is an execution dependency: library functions that are downloaded on-demand if the bot utilizes those functions. Upon completion of the tasks requested of device service 206, user management service 108 and bot packaging service 210, the deployment service 202 issues a run command to node manager 212 resident in selected device 114. The run command includes an identification of the requested bot (e.g. BR1 in FIG. 1), the required user token(s) and session information which uniquely identifies a UI desktop on a machine that is capable of running multiple desktops in parallel. Without this information a bot may start running on the wrong session. The run command is provided to node manager 212 resident on device 114. Also, resident on the device 114 is user session manager 214 which employs the user token(s) to obtain user credentials 115 from credential vault 218. The user session manager 214 also employs the bot identifier received by the node manager 212 from the deployment service 202 to download the requested bot BR1 from repository service 220 and to initiate execution of the requested bot BR1. The user session manager 214 also performs general user session management functions such as initiating a session 216 on device 114 that corresponds to a particular user and that provides a context for execution of the requested bot, along with reporting of progress to operation room service 222.

In certain embodiments, the node manager 212 provides three functions. First is a discovery service that establishes and maintains a connection to the control room 201. Second, the node manager 212 provides an autologin service that provides a vehicle to allow the control room 201 to login or to create a user session by launching user session manager 214. Third, the node manager 212 provides a logging function to stream all logging data back to the control room 201.

In certain embodiments, the user session manager provides five functions. First is a health service that maintains and provide a detailed logging of bot execution including monitoring memory and CPU usage by the bot. Second is a message queue for exchange of data between bots executed within the same user session. Third is a deployment service that connects to the control room 201 (repository service 220) to request with the bot identifier download of the requested bot BR1. The deployment service also ensures that the environment is ready for bot execution such as by making available dependent libraries. Fourth is a bot launcher which reads metadata associated with requested bot BR1 and launches an appropriate container and begins execution of the requested bot. Fifth is a debugger service that can be used to debug bot code.

The centralized credential vault (CV) 218 operates to securely store all credentials and provision them to bots on an on-demand basis. The CV preferably implements NIST controls IA-2 to uniquely identify and authenticate organizational users (or processes acting on behalf of organizational users). Since sensitive credentials need not be stored in bots or on bot runner systems, the CV facilitates a logical separation of credentials from the bots. CV variables are created from a control room and are instantly available to all the bot creators and bot runners registered with the respective CR. The CV adds flexibility and dynamic character to bots since only the credential references are present in the bots and not the credentials. When bots are moved from one environment to another environment, absolutely no change is needed in bots. Bots can seamlessly pick up the credential values applicable for the new environment from the CR of that environment. Additionally, the CR automatically stores configuration related sensitive data into the CV by default. Additional details of the credential vault 218 are described in pending U.S. patent application Ser. No. 15/957,917 entitled "ROBOTIC PROCESS AUTOMATION SYSTEM AND METHOD WITH SECURE CREDENTIAL VAULT" which is assigned to the assignee of the present application and which is hereby incorporated by reference in its entirety.

Figure 2B:
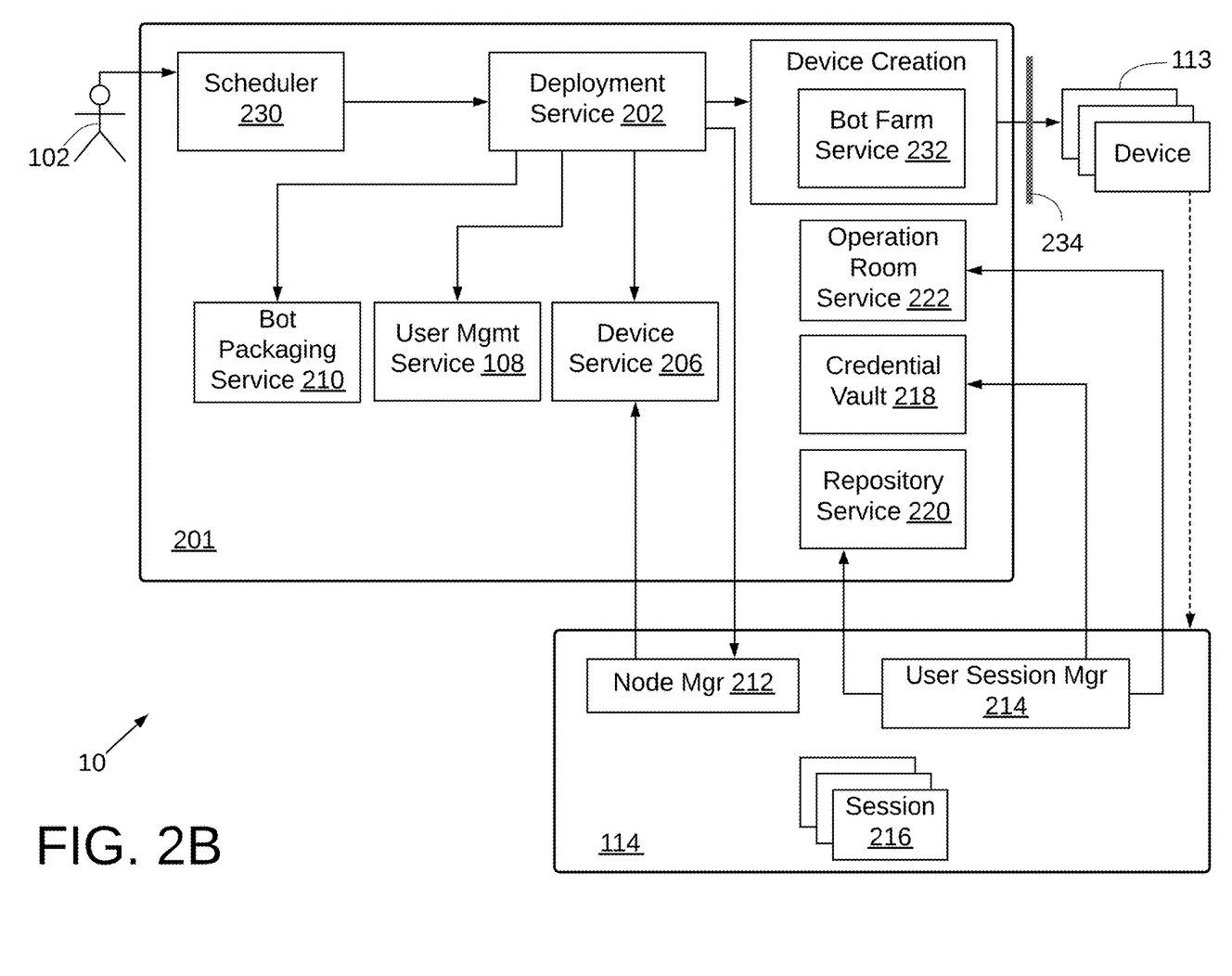
FIG. 2B is block diagram illustrating functional modules of a second embodiment of the RPA system 10.

FIG. 2B is block diagram illustrating functional modules of a second embodiment of the RPA system 10. The embodiment of FIG. 2B is similar to that of FIG. 2A but with the addition of scheduler 230, device creation via bot farm service 232 and compliance boundary 234. Scheduler 230 provides the capability to schedule execution of the bots requested by deployment user 102 at particular time(s) or in accordance with other criteria such as device availability. The scheduler 230 can also schedule execution to repeat at a specified interval. Moreover, the scheduler 230 can also include what user the bot should run as, which is distinct from what user created the schedule. Bot farm service 232 provides virtual devices to supplement or replace the available devices 113. This functionality permits provisioning of virtual devices on demand to provide highly scalable processing capability for the RPA system 10. In the embodiment of FIG. 2B, the deployment service 202 provides the bot farm service 232 with a create device command along with a count of the number of devices to be created, a blueprint of the devices to be created and a device token for each device to be created. The bot farm service 232 creates the requested devices in accordance with the provided blueprint and provides the device tokens to the created devices.

In certain instances, some or all of the devices in device pool 113 may be located remotely from the control room 201 and may even be part of another organization. In such an instance, compliance boundary 234 may be employed to represent a logical boundary, across which, any transfer of data or other information is controlled by agreements between parties. In certain embodiments, a remote access module (not shown) within the control room 201 may operate to prevent any bot from performing certain tasks on system 10, by way of example and not limitation, copying files, loading cookies, or transmitting data from RPA system 10, through or beyond compliance boundary 234 via the internet or via any other output device that would violate the security protocols established by the RPA system 10. The remote access module may take the form of remote desktop products available from Citrix or Microsoft, which permit connection to a remote computer, such as RPA system 10, to establish a communication link between system 10 and a remotely located device to permit apps, files, and network resources to be made available from computer system 10 to the remotely located device. Additional details of operation of an embodiment of RPA system 10 and in particular the compliance boundary 234 are described in U.S. Pat. No. 9,954,819, entitled "SYSTEM AND METHOD FOR COMPLIANCE BASED AUTOMATION" and assigned to the assignee of the present application, which is hereby incorporated by reference.

In certain embodiments where large numbers of automation tasks are required to be performed within a specified period of time, the deployment of bots may be performed in accordance with methods and systems described in pending patent application, which is assigned to the assignee of the present application, entitled "ROBOTIC PROCESS AUTO- MATION SYSTEM WITH SERVICE LEVEL AGREEMENT BASED AUTOMATION", filed on Apr. 20, 2018, assigned application Ser. No. 15/957,915, and which is hereby incorporated by reference in its entirety.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Figure 3:
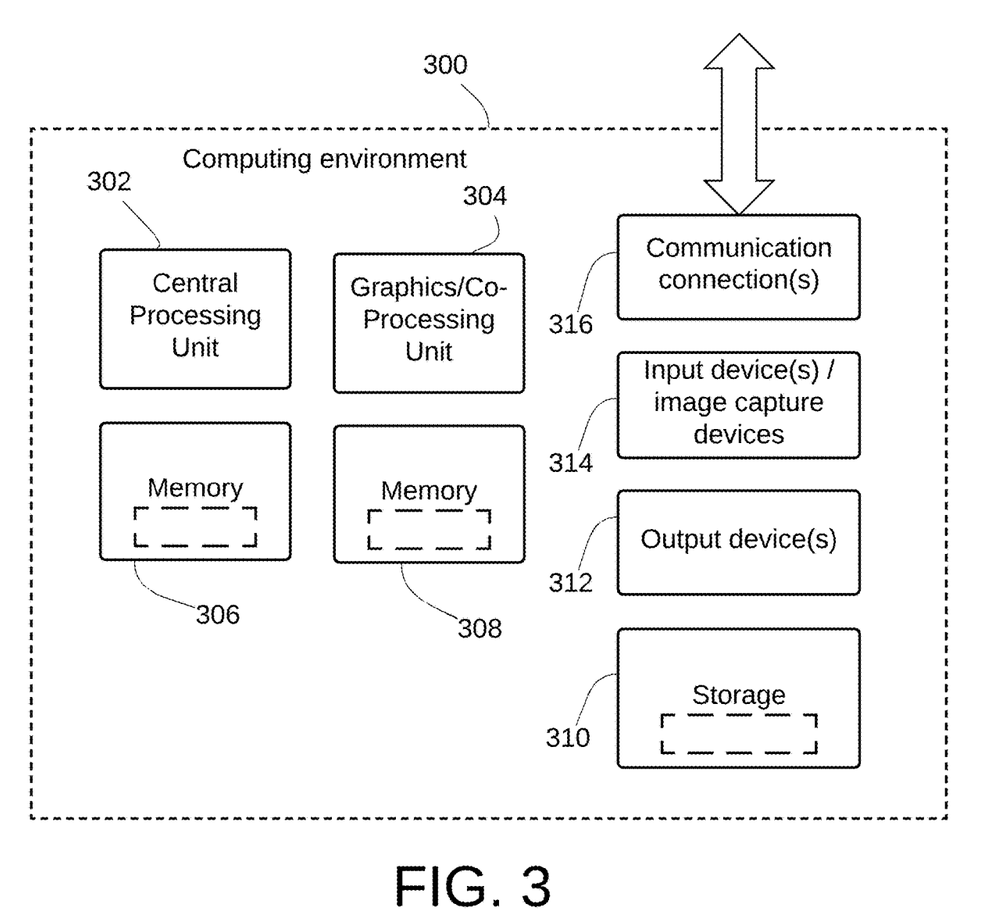
FIG. 3 illustrates a block diagram of hardware that may be employed in an implementation of the RPA system as disclosed herein.

FIG. 3 illustrates a block diagram of hardware that may be employed in an implementation of the RPA system as disclosed herein. FIG. 3 depicts a generalized example of a suitable general-purpose computing system 300 in which the described innovations may be implemented in order to improve the processing speed and efficiency with which the computing system 300 operates to perform the functions disclosed herein. With reference to FIG. 3 the computing system 300 includes one or more processing units 302, 304 and memory 306, 308. The processing units 302, 306 execute computer-executable instructions. A processing unit can be a general-purpose central processing unit (CPU), processor in an application-specific integrated circuit (ASIC) or any other type of processor. The tangible memory 306, 308 may be volatile memory (e.g., registers, cache, RAM), non-volatile memory (e.g., ROM, EEPROM, flash memory, etc.), or some combination of the two, accessible by the processing unit(s). The hardware components in FIG. 3 may be standard hardware components, or alternatively, some embodiments may employ specialized hardware components to further increase the operating efficiency and speed with which the system 100 operates. The various components of computing system 300 may be rearranged in various embodiments, and some embodiments may not require nor include all of the above components, while other embodiments may include additional components, such as specialized processors and additional memory.

Computing system 300 may have additional features such as for example, storage 310, one or more input devices 314, one or more output devices 312, and one or more communication connections 316. An interconnection mechanism (not shown) such as a bus, controller, or network interconnects the components of the computing system 300. Typically, operating system software (not shown) provides an operating system for other software executing in the computing system 300, and coordinates activities of the components of the computing system 300.

The tangible storage 310 may be removable or non-removable, and includes magnetic disks, magnetic tapes or cassettes, CD-ROMs, DVDs, or any other medium which can be used to store information in a non-transitory way, and which can be accessed within the computing system 300. The storage 310 stores instructions for the software implementing one or more innovations described herein.

The input device(s) 314 may be a touch input device such as a keyboard, mouse, pen, or trackball, a voice input device, a scanning device, or another device that provides input to the computing system 300. For video encoding, the input device(s) 314 may be a camera, video card, TV tuner card, or similar device that accepts video input in analog or digital form, or a CD-ROM or CD-RW that reads video samples into the computing system 300. The output device(s) 312 may be a display, printer, speaker, CD-writer, or another device that provides output from the computing system 300.

The communication connection(s) 316 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A method of deploying bots within a robotic process automation system, comprising:
receiving from a deployment user a bot deployment request comprising a bot identification that identifies a specific preexisting bot encoded to perform predefined application level tasks that may be performed by an individual human user, and wherein the bot deployment request further comprises an authorized class of user to execute the specific preexisting bot, wherein the authorized class of user corresponds to a group of users, the group of users comprising stored identities of one or more individual human users authorized to perform the application level tasks to be performed by the specific preexisting bot;
checking deployment credentials of the deployment user to determine if the deployment user is authorized to deploy the specific preexisting bot with credentials of the authorized class of user;
if the deployment user is authorized to deploy the specific preexisting bot then:
identifying from a set of available devices an execution device upon which the specific preexisting bot is permitted to execute;
issuing an authorization token for the execution device to uniquely identify the execution device and to authorize the execution device to communicate with the robotic process automation system;

providing, in response to a request by the execution devices the specific preexisting bot and user tokens corresponding to one or more individual human users in the authorized class of user to the execution device, wherein the specific preexisting bot is permitted to execute on the execution device automatically without input from any individual human user corresponding to the authorized class of user;

providing to the execution device, as a function of the user tokens, one or more credentials corresponding to the one or more the user tokens; and permitting a session with the authorized class of user by the specific preexisting bot using the one or more credentials.

2. The method of claim 1 wherein the bot deployment request further identifies a number of devices requested to execute the specified bot.

3. The method of claim 2 wherein the bot deployment request further identifies a specific device or a type of device.

4. The method of claim 3 further comprising queuing the bot deployment request in an event the specific device requested in the bot deployment request is in use.

5. The method of claim 4 further comprising storing prior bot deployment requests of the bot deployment user and providing at least certain prior bot deployment requests for selection by the bot deployment user.

6. The method of claim 1 wherein the bot deployment request further comprises a template of a requested device, wherein the template comprises one or more of processing capability, storage requirements, and software accessible by the requested device.

7. A robotic process automation system comprising:
data storage for storing at least:
a plurality of sets of task processing instructions, each set of instructions encoding a bot operable to interact at a user level with one or more designated user level application programs; and
information, at least some of which is stored as files, for processing by one or more devices executing a corresponding bot; and
a processor operatively coupled to the data storage and configured to execute instructions that when executed cause the processor to at least:
receive from a deployment user a bot deployment request comprising a bot identification that identifies a specific preexisting bot, and wherein the bot deployment request further comprises an authorized class of user to execute the specific preexisting bot, wherein the authorized class of user corresponds to a group of users, the group comprising stored identities of one or more individual human users authorized to perform the application level tasks to be performed by the specific preexisting bot; and
check deployment credentials of the deployment user to determine if the deployment user is authorized to deploy the specific preexisting bot with credentials of the authorized class of users,
wherein if the deployment user is authorized to deploy the specific preexisting bot, then the processor is configured to at least:
identify from a set of available devices an execution device upon which the specific preexisting bot will execute;
issue an authorization token to the execution device to uniquely identify the execution device and to authorize the execution device to communicate with the robotic process automation system;
provide, in response to a request by the execution device, the specific preexisting bot and user tokens corresponding to one or more individual human users in the authorized class of user to the execution device, wherein the specific preexisting bot executes on the execution device without requiring input from any individual human user corresponding to the authorized class of user; and
execute the preexisting bot on the execution device, wherein executing the preexisting bot comprises:
providing to the execution device, as a function of the user tokens, one or more credentials corresponding to the one or more the user tokens; and
permitting a session with the authorized class of user by the specific preexisting bot using the one or more credentials.

8. The robotic process automation system of claim 7 wherein the bot deployment request further identifies a number of devices requested to execute the specified bot.

9. The robotic process automation system of claim 8 wherein the bot deployment request further identifies a specific device or a type of device.

10. The robotic process automation system of claim 9 wherein the processor is further configured to execute instructions that when executed cause the processor to: queue the bot deployment request in an event the specific device requested in the bot deployment request is in use.

11. The robotic process automation system of claim 10 wherein the processor is further configured to execute instructions that when executed cause the processor to: store prior bot deployment requests of the bot deployment user and provide at least certain prior bot deployment requests for selection by the bot deployment user.

12. The robotic process automation system of claim 7 wherein the bot deployment request further comprises a template of a requested device, wherein the template comprises one or more of processing capability, storage requirements, and software accessible by the requested device.

13. A robotic process automation system comprising:
data storage for storing,
a plurality of sets of task processing instructions, each set of instructions encoding a bot operable to interact at a user level with one or more designated user level application programs; and
information, at least some of which is stored as files, for processing by devices executing a corresponding bot;
a control room comprising,
a deployment service responsive to a bot deployment request from a deployment user, the bot deployment request comprising a bot identification that identifies a specific preexisting bot, and wherein the bot deployment request further comprises an authorized class of user to execute the specific preexisting bot, wherein the authorized class of user corresponds to a group of users, the group comprising stored identities of one or more individual human users authorized to perform the application level tasks to be performed by the specific preexisting bot, the deployment service,
checking deployment credentials of the deployment user to determine if the deployment user is authorized to deploy the specific preexisting bot with credentials of the authorized class of user and if the deployment user is determined to be authorized to deploy the specific preexisting bot, then issuing a device request, and issuing a request for a user token corresponding to credentials for each individual human user required by the specific preexisting bot;

a device service responsive to the device request for assigning a device and for providing an identifier of the assigned device;

a user management service responsive to the request for a user token for retrieving one or more user tokens corresponding to the request for a user token and or providing the user tokens to the deployment service; and a packaging service for compiling the specific preexisting bot and for packaging, with the specific preexisting bot, dependencies required by the specific preexisting bot, wherein the deployment service responds to completion of tasks performed, in relation to the specific preexisting bot, by the device service, the user management service, and the packaging service by issuing a run command and causing delivery of the run command with the one or more user tokens to the assigned device, wherein the run command includes session information comprising an identification of a session within which the specific preexisting bot must execute, and wherein the control room further comprises a credential vault that responds to a request for user credentials generated by the assigned device as a function of the one or more user tokens by retrieving one or more user credentials corresponding to the one or more user tokens and providing the one or more user credentials to the assigned device for initiating a session with the authorized class of users with the specific preexisting bot.

14. The robotic process automation system of claim 13 wherein the control room further comprises a repository service that responds to a request for the specific preexisting bot by retrieving the specific preexisting bot and causing delivery of the specific preexisting bot to the assigned device.

15. The robotic process automation system of claim 13 wherein the bot deployment request further identifies a number of devices requested to execute the specific preexisting bot.

16. The robotic process automation system of claim 15 wherein the control room further comprises a repository service that responds to a request for the specific preexisting bot by retrieving the specific preexisting bot and causing delivery of the specific preexisting bot to the assigned device.

* * * * *